United States Patent [19]

McElroy

[11] 4,027,916
[45] June 7, 1977

[54] SEAT ARMREST AND PROCESS OF MANUFACTURE THEREOF

[75] Inventor: Bennitt McElroy, Rural Hall, N.C.

[73] Assignee: Fairchild Industries Inc., Germantown, Md.

[22] Filed: Dec. 15, 1975

[21] Appl. No.: 640,917

[52] U.S. Cl. .............................. 297/194; 297/411; 297/422
[51] Int. Cl.² ......................................... A47C 7/62
[58] Field of Search .............. 5/280; 297/113, 194, 297/411, 416, 422, DIG. 6

[56] References Cited

UNITED STATES PATENTS

| | | | |
|---|---|---|---|
| 2,802,518 | 8/1957 | Liljengren | 297/411 |
| 3,279,849 | 10/1966 | Badke et al. | 297/DIG. 6 |

FOREIGN PATENTS OR APPLICATIONS 2,006,317  8/1971  Germany .......................... 297/194

*Primary Examiner*—James C. Mitchell
*Attorney, Agent, or Firm*—Michael W. York

[57] ABSTRACT

A seat armrest and process of manufacturing same, including an armrest frame member and three shell members located around the frame member. All of the shell members have a depressed central portion and outer rim portions and one of the shell members is so sized so that it is slideable into one of the other shell members which is in turn connected to the arm frame member. The third shell member is then slideable over the other two combined shell members, and the inner wall of that shell member and the outer wall of the adjacently located shell member form a pocket in the seat armrest. A panel is also provided which is easily attachable to or removable from the armrest.

8 Claims, 3 Drawing Figures

U.S. Patent
June 7, 1977
4,027,916
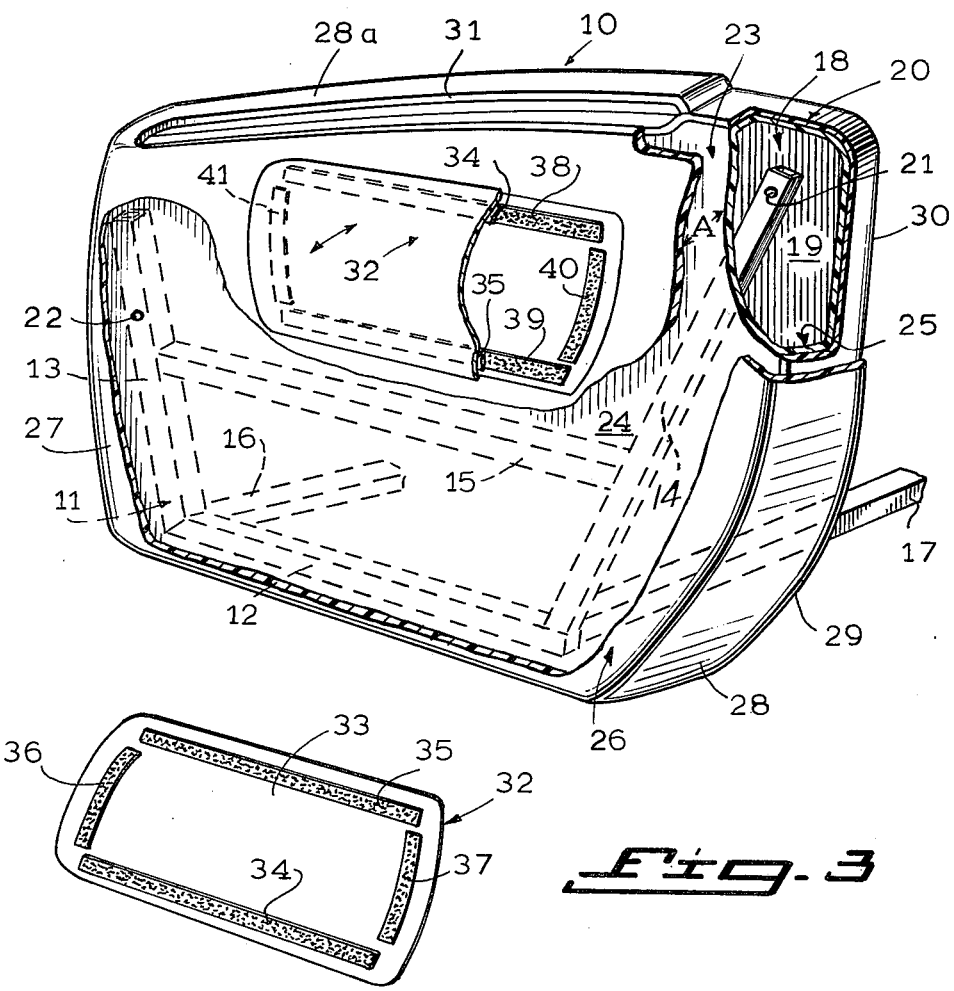
Fig. 1
Fig. 3
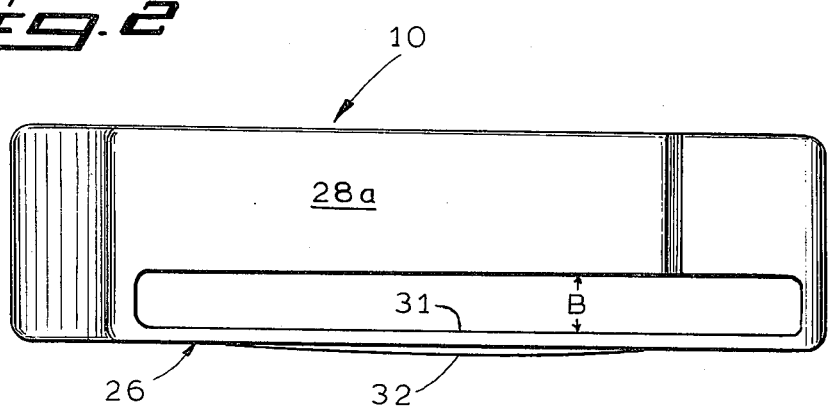
Fig. 2

SEAT ARMREST AND PROCESS OF MANUFACTURE THEREOF

BACKGROUND OF THE INVENTION

Comfortable executive-type and airline-type seats are expensive due to their method of construction and to the amount of labor which must be utilized to produce the seat. Such seats are expected to have a comfortable and attractive armrest portion which contributes to the expensiveness of the seats.

Airline seats and some executive seats are also expected to have an armrest portion which has a slot which may receive a table or the like. This necessity for a slot or pocket increases the complexity of the armrest portion of the seat and is another reason for the relatively large amounts of labor which must be put into the manufacture of the seat armrest portion and the reason for the high cost associated with the seat armrest portion. In addition, many executive or airline seats have some decorative side panel which must be attached to the armrest portion in some manner. In some instances, the panel is merely glued or in some other manner securely affixed in a non-removable manner to the outside portion of the armrest portion. However, in this instance, the panel is not readily removable for cleaning or for changing to a different color or a different configuration of decorative panel. An alternative method of mounting a decorative panel to the outside of the armrest portion of the seat is by use of snaps and the like. Unfortunately, such snaps and the like are difficult to precisely locate and if they are located properly this can consume a considerable amount of time. On the other hand, of course, if the snaps or the like are improperly located, then it is difficult to remove or replace the panel from the armrest portion of the seat.

These difficulties associated with the armrest portions of seats have been reduced or eliminated by the present invention which provides a high quality appearing armrest seat portion which is readily manufactured and assembled in a comparatively short period of time at reduced costs. Furthermore, the addition or removal of the decorative side panel has been greatly simplified with the present invention.

BRIEF DESCRIPTION OF THE INVENTION

This invention relates to seats and more particularly to the armrest portion of the seat and the method of manufacture thereof.

It is an object of the present invention to provide an armrest portion for a seat which has a high quality appearance.

It is also an object of the present invention to provide an armrest portion for a seat which is easy to produce.

It is also an object of the present invention to provide an armrest portion for a seat which can be produced at a comparatively low cost.

It is also an object of the present invention to provide an armrest portion for a seat which is easy to assemble.

It is a further object of the present invention to provide an armrest portion for a seat which has an inexpensively formed pocket.

It is a further object of the present invention to provide a removable seat armrest panel which is easily removable from the armrest portion for a seat and is also easy to replace on the armrest.

It is also an object of the present invention to provide a process of manufacturing the seat armrest which requires few components that are easily manufactured.

It is a further object of the present invention to provide a process of manufacturing an armrest for a seat in which the various components are easily connectable to each other.

It is also an object of the present invention to provide a process for manufacturing a removable seat armrest panel which permits the armrest panel to be easily placed on and removed from the armrest of the seat.

It is a further object of the present invention to provide a process for manufacturing a removable seat armrest panel which does not require precise location of the fastening devices.

The present invention provides an armrest for a seat and the method of manufacture thereof which includes an armrest frame, a first shell with a depressed central portion and an outer rim portion, and a second shell which also has a depressed central portion and an outer rim portion. The sheels are sized to permit one of the shells to be inserted into the other with the depressed portions of the shells facing in different directions. When one of the shells is inserted into the other, both of the shells form a combined unit which is located around at least a portion of the armrest frame.

The present invention also provides a process for manufacturing a removable seat armrest panel which includes providing a material with a pile which has a closed loop and also providing a material with a pile which is hooked-type pile. One type of pile is affixed to either the armrest or the removable panel and the other type of pile material is affixed to the other component. The pile materials are so located that they come in contact with each other when the removable armrest panel is placed in its proper location.

BRIEF DESCRIPTION OF THE DRAWINGS

The invention will be hereinafter more fully described with reference to the accompanying drawings in which:

FIG. 1 is a perspective view of the armrest portion of a seat of the present invention;

FIG. 2 is a top plan view of the structure illustrated in FIG. 1 clearly illustrating the pocket formed in the seat armrest portion; and FIG. 3 is a perspective view illustrating the underside of the removable panel which is attachable and detachable from the armrest portion of the seat illustrated in FIG. 1.

DETAILED DESCRIPTION OF THE PREFERRED EMBODIMENT

Referring to FIGS. 1 and 2, the armrest portion of the seat of the invention is shown and is designated by the number 10. The armrest portion 10 comprises an armrest frame 11 which is constructed from hollow rectangular metallic tubing and comprises a base member 12, two upstanding end members 13 and 14 which are connected at their lower ends to the base member 12, and a cross member 15 which is connected at each of its ends to the respective members 13 and 14. Also as illustrated in FIG. 1, two seat base frame members 16 and 17 extend outwardly in a horizontal direction from the respective junctures of the members 12 and 13 and 12 and 14. These members 16 and 17, of course, help support the cushion of the seat, but they in themselves form no part of the present invention.

The seat armrest portion 10 also comprises an inner shell member 18 which has a depressed portion 19 and a flange around its edges 20. It should be noted that the shell member 18 is connected to the member 14 by the fastener 21, and that it is also connected to the member 13 by the fastener 22. Located around the inner shell member 18 is an outer shell member 23. This shell member 23 likewise has a depressed portion 24 and a flange located around its edge 25. The shell members 18 and 23 are so sized that one shell member can slip into the other to form a compact unit which surrounds at least a portion of the armrest frame 11. The respective flanges of the shell members 18 and 23 would be glued or otherwise bonded to each other by some glue or bonding agent which is known to those skilled in the art.

After the shell members 18 and 23 have had their rims or flanges bonded together, another shell member 26 which also has a depressed portion 27 and an outer rim or flange 28 is slipped over the combined unit formed by the shell members 18 and 23. It will, of course, be appreciated that suitable apertures for the frame members 16 and 17 must be provided in the shell member 18. The shell member 26 has its rim portion 28 bonded or connected to the combined unit formed by the shell members 18 and 23 by some suitable glue or bonding agent which is known in the art. It should be noted that the flange 28 has a width which is greater than the width of the combined unit formed by the shell members 18 and 23, and that the inner edge 29 of the rim 28 is located substantially adjacent to the inner edge 30 of the combined unit formed by the shell members 18 and 23. Consequently, a gap or space exists between the inner surface of the depressed portion 27 of the shell member 26 and the outer surface of the combined unit formed by the shell members 18 and 23. This gap or space is designated by the letter A in FIG. 1. It should also be noted that the upper flange of the shell member 26 which is designated as 28a has an elongated aperture or slot 31 located in it. This slot 31 extends completely through the flange from the exterior of the flange 28a so that the aperture 31 permits access to the area formed by the gap or distance A. The width of this aperture designated by the letter B is substantially equal to the distance or width A. As a result of this aperture 31 and the distance A, a pocket is formed in the outer portion of the armrest portion of the seat 10. This pocket may be useful for storing items such as a tray, briefcase, papers, and other such items.

The armrest portion of the seat 10 which comprises the shell members 18, 23 and 26 may also have a generally flat shaped panel member 32 attached to its outer surface. It will, of course, be appreciated that the armrest portion of the seat 10 may have a suitable portion of it covered by leather or some other decorative material. As illustrated in FIG. 3, the inner surface of panel member 32 which is designated by the number 33 has a series of thin woven strips attached to its outer edge portions. The two long woven strips are designated by the numbers 34 and 35, and the two end strips which are curved are designated by the numbers 36 and 37. These strips 34, 35, 36 and 37 have their inner non-pile surface securely attached by glue or some other agent to the inner surface 33 of the member 32. As illustrated in FIG. 1, similar strips are attached to the outer surface portion of the armrest portion of the seat 10. The elongated woven strip 38 is adapted to contact and hold the corresponding elongated member 34, and the elongated woven member 39 is adapted to contact and hold the member 35. In a similar manner, the curved woven member 40 is adapted to contact and hold the member 37, and the curved elongated member 41 is adapted to contact and hold the corresponding curved member 36. Inner non-pile surfaces of the members 38, 39, 40 and 41 are securely bonded or secured to the outer surface of the armrest portion 10 by some suitable glue or other bonding agent which is known in the art.

The members 34, 35, 36 and 37 illustrated in FIG. 3, and the members 38, 39, 40 and 41 illustrated in FIG. 1 are made from the material called Velcro which is obtainable from the Velcro Corporation, 681 Fifth Avenue, New York, New York. This material is a woven material which has an open loop pile and a corresponding woven material which has a hooked pile that is adapted to engage the loops on the open pile. Normally, a surface 33 would have the strips 34, 35, 36 and 37 composed of either the hooked pile type Velcro material or the open loop type Velcro material, and then the strips illustrated in FIG. 1 as 38, 39, 40 and 41 would have material of the opposite pile, that is, if the strips attached to the surface 33 had the open loop pile then the strips attached to the outer portion of the seat armrest portion 10 would have the hooked type pile. However, if it is desired, the hooked and open type Velcro materials can be interchanged. All that is necessary is that the corresponding strips such as the strip 37 and the corresponding strip 40 be of a dissimilar material. That is, if strip 37 is of the hooked type pile, then the strip 40 should be of the open type pile. This is necessary to insure that the panel 32 can be secured to the seat armrest portion 10. All that is necessary to secure the panel 32 to the outer surface of the seat armrest portion 10 is to place it in its desired location where the corresponding elements such as the element 37 on the inner surface of the panel 32 can contact the corresponding element such as the element 40 on the outer surface of the seat armrest portion and then to exert an inward force against the outer surface of the panel 32. When this is done, the hooks of the Velcro material will engage the loops of the corresponding opposite type Velcro material and the panel will be securely fastened to the seat armrest portion. Then when it is desired to remove the panel 32, all that is necessary is to pull outward against the panel 32 and it can easily be removed as a result of the hooks disengaging the looped pile. This can be done for cleaning purposes, that is to clean the panel 32, or to change its color or fabric or other material that may be located on the outside of the panel 32.

The process of this invention is carried out in the following manner. The shell members 18, 23 and 26 are formed by a suitable process such as a vacuum forming process and then they are trimmed as necessary. Suitable apertures are then cut into the shell member 18 in order to accept the frame members 16 and 17 and, if necessary, apertures are provided for the fasteners 21 and 22. A slot 31 is also provided in the shell member 26 by some suitable process such as cutting or the like. A seat armrest frame is then provided which has holes for the fasteners 21 and 22, and then the shell member 18 is connected to the frame by the fasteners 21 and 22.

The shell member 23 is then slipped into the shell member 18 after a suitable bonding agent has been applied to the flanges of either the shell member 23 or the shell member 18 or to both of their flanges. This results in a unit which surrounds the substantial portion of the frame 11. Of course, during the forming steps of the shell members 18 and 23, all of the shells must be suitably formed so that it is insertable into the other. This is accomplished by forming one of the flanges so that it will fit into the flange of the other shell. The outer shell 26 which has previously had the slot 31 machined or milled into it is then pushed onto the combined unit formed by the shells 18 and 23 so that the edge 29 of its flange 28 is substantially flush with the edge 30 of the combined unit. The shell 26 is securely bonded to the combined unit formed by the shells 18 and 23 by using some bonding agent on the combined unit in or on the flange 28 or by using some other appropriate fastener such as screws and the like. Of course, it will be appreciated that in the forming step the shell 26 had to be formed with its flange suitably located so that it will be slideable over the combined unit formed by the shells 18 and 23.

The process of manufacturing the removable seat armrest panel 32 is accomplished in the following manner. Strips of Velcro material having their pile facing outward are attached at suitable locations on the armrest portion 10. A substantially flat panel member 32 is then provided and strips of the appropriate opposite type of material are then attached to its inner surface 33. As a consequence, suitably alternate grippable and releasable material strips are attached in suitable locations on the seat armrest portion and on the underside 33 of the panel 32 where they can contact at least a portion of the oppositely located material when the panel member 32 is placed in its desired location. The panel 32 can then be placed on the seat armrest member by pressing the panel into its desired location so that at least portions of the looped pile material and the hooked pile material will contact each other and hold the panel to the armrest member. It will, of course, be appreciated that panel 32 will probably be covered with some suitable fabric or other decorative material such as a natural or aritificial leather. When it is desired to clean the fabric or other decorative material, the panel 32 may be easily removed from the seat armrest by merely placing your fingers under the edge of the panel and pulling it away from the seat armrest member. Then, of course, the panel can be cleaned or the material can be changed and the panel can be easily replaced by pressing it into its suitable location on the outside of the seat armrest 10. This process of removing and replacing the panel 32 can, of course, be repeated many times.

It will, of course, be appreciated that the other portions of the seat which are connected to the seat armrest portion 10 have not been discussed since they are not necessary for one skilled in the art to understand the apparatus or process of this invention.

Although the invention has been described with reference to a certain preferred embodiment, it will be understood that variations and modifications may be made within the spirit and the scope of the invention as defined in the appended claims.

What is claimed is:

1. An armrest for a seat comprising a first shell, said first shell comprising a central substantially flat portion with a flange extending outward therefrom, a second shell, said second shell comprising a central substantially flat portion with a flange extending outward therefrom, the flanges of said first and said second shells being formed so that the flange of one shell fits into the flange of the other shell, the flanges of said first and said second shells being interconnected with the flange of one shell fitting into the flange of the other shell to form a combined unit comprising said first and second shells, and a third shell member, said third shell member having a central substantially flat portion with a flange extending outward therefrom, the flange of said third shell being formed to be slidable over the unit formed by said first and said second shells, the flange of said third shell being connected to the combined unit formed by said first and second shells after the flange of said third shell has been slid over the unit formed by said first and said second shells.

2. The armrest for a seat of claim 1 wherein the width of the flange of said third shell is greater than the width of the combined unit comprising said first and second shells.

3. The armrest for a seat of claim 2 wherein the inner surface of said third shell and the outer surface of the combined unit comprising said first and second shells forms a pocket.

4. The armrest for a seat of claim 3 wherein the flange of said third shell has elongated aperture.

5. The armrest for a seat of claim 4 wherein the aperture in the flange of said third shell comprises elongated slot extending through the flange.

6. The armrest for a seat of claim 5 wherein the width of the slot located in the flange of said third shell is substantially equal to the width of the pocket formed by the inner surface of said third shell and the outer surface of said combined unit comprising said first and second shells.

7. A process of manufacturing a seat armrest comprising the steps of forming a first shell having a central substantially flat portion with a flange extending outward therefrom, forming a second shell having a central substantially flat portion with a flange extending outward therefrom, during the steps of forming said first and second shells forming the flange of one of said first or second shells so that the flange of one of said first or second shells so that it is insertable into the flange of the other of said first or second shells, inserting one of the flanges of said first or second shells into the flange of the other of said first or second shells connecting them together to form a combined unit comprising said interconnected first and second shells forming a third shell having a central substantially flat portion with a flange extending outward therefrom, during the process of forming said third shell forming the flange of said third shell so that it will be slidable over the combined unit formed by the interconnected first and second shells, sliding the flange of said third shell over the combined unit formed by said first and second shells and connecting the flange of said third shell to the combined unit formed by said first and second shells.

8. The proces of manufacturing a seat armrest of claim 7 including the step of providing a slot in a portion of the flange of said third shell.

* * * * *